United States Patent [19]

Kanari

[11] Patent Number: 4,623,110
[45] Date of Patent: Nov. 18, 1986

[54] MOUNTING DEVICE OF EQUIPMENTS FOR USE ON VEHICLES

[75] Inventor: Mitsuru Kanari, Iwaki, Japan

[73] Assignee: Alpine Electronics Inc., Japan

[21] Appl. No.: 686,228

[22] Filed: Dec. 26, 1984

[30] Foreign Application Priority Data

Dec. 26, 1983 [JP] Japan .......................... 58-200687[U]
Jun. 30, 1984 [JP] Japan ........................... 59-99539[U]

[51] Int. Cl.$^4$ ............................................. G12B 9/00
[52] U.S. Cl. ................................................. 248/27.1
[58] Field of Search ............... 248/27.1, 27.3, DIG. 6; 312/245; 200/295, 296

[56] References Cited

U.S. PATENT DOCUMENTS 3,337,168 8/1967 Albrecht ............................ 248/27.1
3,744,748 7/1973 Harrold ............................. 248/27.1
4,000,874 1/1977 Finley et al. ............. 248/DIG. 6 X
4,051,916 10/1977 Oda .............................. 248/27.1 X
4,372,509 2/1983 Krainhöfer ......................... 248/27.1
4,378,099 3/1983 Ikeda et al. ........................ 248/27.3
4,462,564 7/1984 Alves et al. ........................ 248/27.1

Primary Examiner—Ramon S. Britts
Assistant Examiner—Ramon O. Ramirez
Attorney, Agent, or Firm—Guy W. Shoup

[57] ABSTRACT

A mounting device for mounting an equipment body on a vehicle having an installation base member. The equipment body is equipped with a fastening member pivotable on a moving member and urged outward by a spring, and a pinching portion for pinching the installation base member together with the fastening member. When to detach the equipment body the fastening member is departed from the installation base member and moved back by moving the moving member until the fastening member is pushed inward by a pushing portion.

8 Claims, 14 Drawing Figures

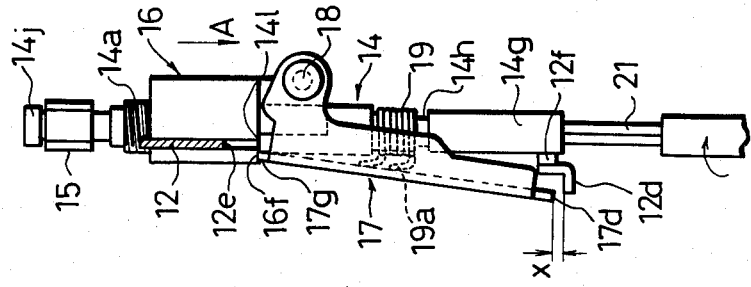
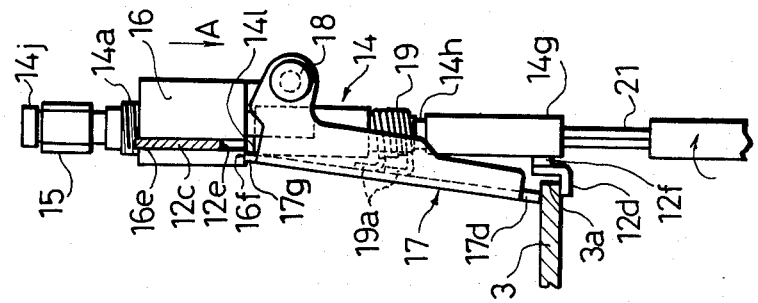
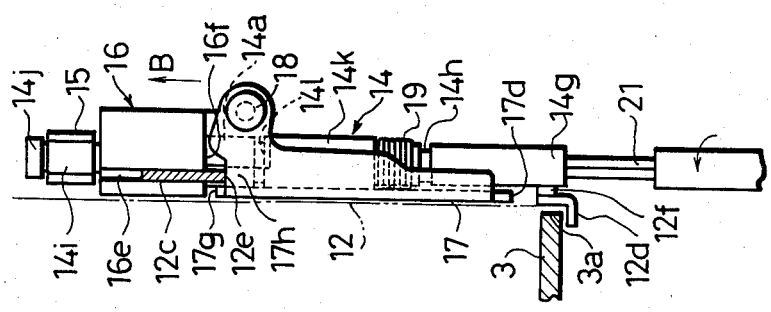

MOUNTING DEVICE OF EQUIPMENTS FOR USE ON VEHICLES

FIELD OF THE INVENTION

The present invention relates to a mounting device of equipment for use on vehicles, such as car stereo or car radio-set, and, particularly, to the mounting device for equipments of the in-dash type.

BACKGROUND OF THE INVENTION

The prior art will be described with reference to FIGS. 1 and 2 illustrating the conventional mounting device of equipments for use on vehicles of the in-dash type. In these drawings, 1 is a body of an equipment for use on vehicles, and 2 is a nose section attached to the body 1. 3 is a dashboard of a car which is bored with a mounting hole 3a of a rectangular form for the purpose of mounting the body 1 and the like.

In the attaching work, an inner case 4 is first attached inside the mounting hole 3a. This inner case 4 is made of plate material and shaped into a square tube form. When attaching the inner case 4, as shown in FIG. 2, a flange 4a provided at the front opening portion of the inner case is fitted to the front of the dashboard 3 and elastic pieces 4b provided integrally on upper and lower surfaces of the inner case 4 are fastened to the inner face of the dashboard 3. Then, the body 1 and the nose section 2 joined into one unit are inserted through the opening portion of the inner case 4. After that, levers 5 exposed from the right and left side end portions of the nose section 2 are pivoted so that a hook 5a formed at the back portion of each lever 5 by bending the same outward latches on a projection portion 4c projecting inward from each side plate of the inner case 4 thereby to fix the body 1 and the nose section 2. Further, in order to cover the levers 5 projecting from the side portions of the nose section 2, a gasket 6 is attached to the front periphery of the nose section 2.

However, the conventional mounting device of the equipment for use on vehicles has the drawbacks that a number of working steps are required in mounting the equipment and a long time is needed for the mounting work. Specifically, when detaching, it is difficult to remove the inner case 4 from the mounting hole 3a, so that the maintenance work becomes complicated. Further, because the body 1 is settled only by the hooks 5a of the levers 5, its mounting is incomplete. Furthermore, because the gasket 6 to cover the nose section 2 must be prepared as an independent member, there are such inconveniences as that the number of parts composing the casing is many, thus, the equipment body becomes a large-sized one.

SUMMARY OF THE INVENTION

The present invention has been devised in view of the drawbacks of the foregoing prior art, and its object is to provide a mounting device of equipments for use on vehicles which is reduced in number of parts composing the equipment casing, is favourable in appearance, and permits reliable attaching and detaching of the equipment relative to an installation base member such as the dashboard through simple operations.

It is another object of the present invention to provide a mounting device of equipments for use on vehicles by which the equipment body can be settled at a moderate fixing pressure against the installation base member.

Therefor, the mounting device of equipments for use on vehicles according to the present invention has the structure in that inside a side plate of an equipment body a screw shaft is provided extending in the body-insertion direction relative to an installation base member, a fastening member is pivoted on a moving member screw-coupled with the screw shaft, this fastening member is urged by a spring in the direction of projecting beyond the side plate, the equipment body is provided with a pinching portion for pinching the installation base member together with the projected fastening member, the equipment body is also provided with a pushing portion which abuts upon the fastening member to pivot the fastening member inside the side plate when the moving member is moved by means of the screw shaft in the direction of departing from the pinching portion, whereby only through rotation of the screw shaft, resulting in a movement of the moving member, the fastening member projects to the position where it can pinch the installation base member, as well as retracts from the pinchable position.

In a modified feature, the present mounting device has the structure in that on a side plate of an equipment body there are provided a screw shaft extending in the body-insertion direction into an installation base member and a moving member screw-coupled with the screw shaft, on the moving member a fastening member is supported which is urged by a spring as to pivot in the direction of projecting beyond the side plate, the equipment body is provided with a pinching portion which pinches the installation base member together with the fastening member projecting by the action of the spring when the moving member is moved by the operation of the screw shaft, a stopper is provided on the screw shaft and the like which stops the moving member when a certain distance is obtained between the fastening member and the pinching portion while the moving member moves in the pinching direction relative to the installation base member, and a pushing portion is provided on the side plate and the like which abuts upon the fastening member moving back together with the moving member to pivot the fastening member inside the side plate when the moving member is moved back in the direction of departing from the pinching portion, whereby only through movement of the moving member caused by the rotation of the screw shaft, resulting in a projecting of the fastening member beyond the side plate, the installation base member is pinched by the fastening member and the pinching portion, and the movement of the moving member is restricted by the stopper to prevent an excessive pinching pressure being imposed on the installation base member.

BRIEF DESCRIPTION OF THE DRAWINGS

FIGS. 12(A) through 12(C) are views for explanation of the operation of the second embodiment.

DETAILED DESCRIPTION OF THE INVENTION

The present invention will be described with reference to FIG. 3 and so forth.

Figure 3:
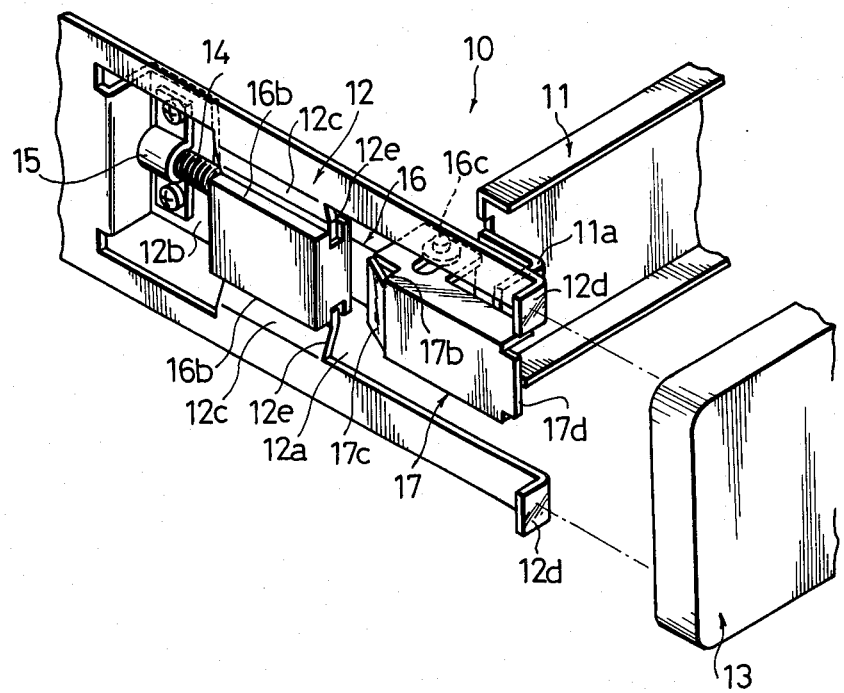
FIG. 3 is a perspective view of a first embodiment of the mounting device of equipments for use on vehicles according to the present invention.
Figure 4:
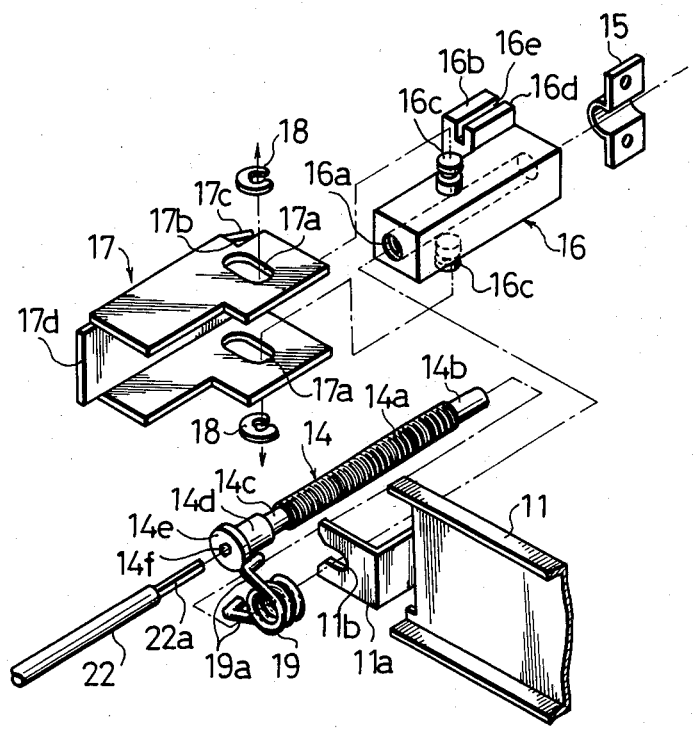
FIG. 4 is an exploded perspective view similar to FIG. 3, but observed from the opposite direction.

FIGS. 3 through 9 illustrate the first embodiment of the mounting device according to the present invention, in which FIG. 3 is the perspective view, FIG. 4 is the exploded perspective view observed from the opposite direction to FIG. 3, and FIGS. 5 through 9 are the explanatory views showing the attaching and detaching operations.

Figure 5:
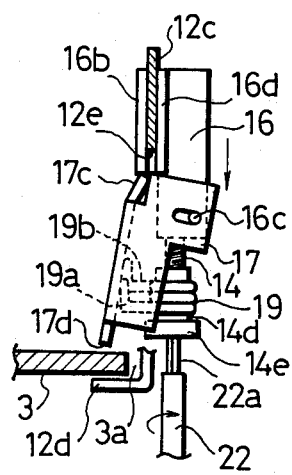
FIG. 5 is a plane view of a fastening member in one operation position.
Figure 6:
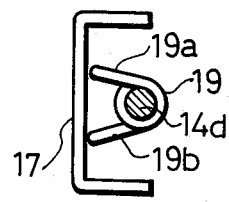
FIG. 6 is an end view of the fastening member showing the installed state of a spring in one operation position.

FIG. 3 illustrates in the perspective view a portion of a body 10 of an equipment for use on vehicles, used as car radio or car stereo-set. The casing of the body 10 is composed of a front chassis 11, side plates 12, a nose section 13 to cover the front of the front chassis 11, and the like. The nose section 13 is formed by resin material. For explanation, the body 10 of the equipment for use on vehicles is to be mounted to an installation base member (for example, the car dashboard) indicated by "3" in FIG. 1. As shown in FIG. 5 and so forth, the installation base member 3 is bored with the mounting hole 3a into which the body 10 is inserted.

The front chassis 11, side plates 12 and nose section 13 composing the body 10 are assembled and settled together by means of screws or other means. Here, the configuration of the body 10 is bilaterally symmetrical, so that the same mechanism as that shown in FIG. 3 is also provided on the right side plate of the body 10. As shown in FIG. 3, the side plate 12 is formed with a notch 12a. In rear of this notch 12a there is provided a support rest 12b formed by bending a plate inward into the form of a crank, and at the center portion of the notch 12a there are provided guide plates 12c bent into a substantially L-shaped form and extending inward from the upper and lower margins of the notch. The front edge of each guide plate 12c forms a pushing portion 12e for pivoting a fastening member 17 which will be described hereinafter. Further, the front ends of the side plates 12 are bent outward as to form a pair of pinching portions 12d. In addition, as shown in FIG. 4, at each side end portion of the front chassis 11 there is provided a support piece 11a formed by bending into the form of a crank, this support piece 11b being formed with a notch 11b. Thus, a screw shaft 14 is supported rotatably by the support rest 12b and the support piece 11a. As shown in FIG. 4, this screw shaft 14 is formed on its center portion with a screw 14a, with its front and rear sections shaped into small-diameter support portions 14b and 14c. Further, in front of the front support portion 14c there is formed a large-diameter spring support portion 14d. Furthermore, ahead of the spring support portion 14d there is provided a flange 14e which is bored in its front face with a hexagonal hole 14f. This screw shaft 14 is rotatably attached with its front support portion 14c supported by the notch 11b at the side end of the front chassis 11 and its rear support portion 14b held on the support rest 12b of the side plate 12 by the aid of a retaining metal fitting 15. The front spring support portion 14d is provided with a spring 19 therearound. A pair of arms 19a of this spring 19 are facing the side plate 12.

The screw shaft 14 passes through a moving member 16 and is screw-coupled therewith. This moving member 16 is formed by metal such as aluminium into a block shape. The moving member 16 has a female screw hole 16a formed in its center which female screw hole is coupled with the screw 14a of the screw shaft 14. Further, the moving member 16 is provided on its one side with an upper rib 16b and a lower rib 16d, with each rib formed with a guide groove 16e. As shown in FIG. 3, the guide groove 16e is engaged with the guide plate 12c of the side plate 12 so that the moving member 16 is slidable frontward and rearward along the side plate 12. Further, the moving member 16 has a pair of pins 16c fixed on its upper and lower faces. Furthermore, this moving member 16 has a fastening member 17 attached thereto. This fastening member 17 is formed by bending a plate into the shape of a "U". The bent portion of this U-shaped member is bored with slots 17a elongating laterally into which the pins 16c are inserted, with rings 18 fitted on the pins for prevention of falling out. In this way, the fastening member 17 is supported pivotably on the pins 16c. At the rear corner of the fastening member 17 are formed notches 17b, and at the position of these notches 17b the side plate 17c of the fastening member 17 is bent. Further, a tip 17d of the fastening member 17 is positioned so that it opposes inside the notch 12a of the side plate 12 to the pinching portion 12d. In addition, a pair of arms 19a of the spring 19 abut upon the inner face of the fastening member 17, so that the fastening member 17 is urged as to project beyond the side plate 12 (see FIG. 6) by the spring action.

Now, the work of attaching and detaching the equipment body 10 for use on vehicles relative to the installation base member 3 will be described.

In the attaching and detaching work of the body 10 of the equipment for use on vehicles, a hexagonal lever 22 is used as a tool. This hexagonal lever 22 is made in an L-shaped form and provided at its tip with a hexagonal projection 22a.

Figure 7:
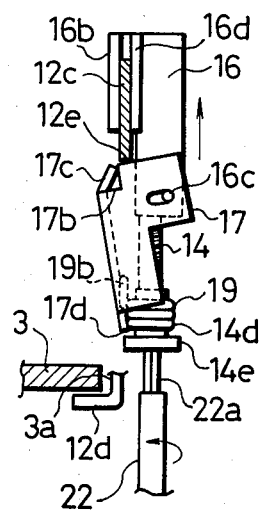
FIG. 7 is a plane view of the fastening member in the other operation position.
Figure 8:
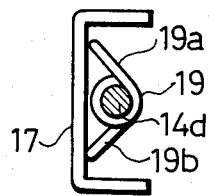
FIG. 8 is an end view of the fastening member showing the installed state of the spring in the other operation position.
Figure 9:
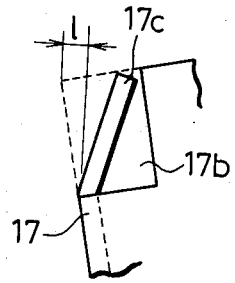
FIG. 9 is a partial enlarged view of the fastening member.

FIGS. 5 and 7 illustrate the state where the equipment body 10 has been inserted through the mounting hole 3a of the installation base member 3. Before insertion of the equipment body 10, the screw shaft 14 is rotated in the counterclockwise direction by the use of the hexagonal lever 22 fitted in a hexagonal hole 14f formed in the front face of the screw shaft 14, as shown in FIG. 7. By this rotation the moving member 16 moves back together with the fastening member 17 in the arrow direction as viewed in FIG. 7. At this position, because the guide plate 12c of the side plate 12 is stationary, the pushing portion 12e at the front edge of the guide plate pushes the rear end of the fastening member 17. As a result, the fastening member 17 pivots about the pin 16c in the counterclockwise direction and its tip 17d comes to the position inside the side plate 12. At this position, as shown in FIG. 8, the arms 19a of the spring 19 flex. If the equipment body 10 is inserted through the mounting hole 3a under the state shown in FIG. 7, the fastening member 17 could not abut upon the installation base member 3. Further, because the notches 17b are formed at the rear corner portion of the fastening member 17 as shown in FIG. 9, the projecting distance of the fastening member 17 from the side plate 12 after the member 17 has been pivoted in the counterclockwise direction is made small by the length indicated by "l", so that this reduces remarkably the change of the corner portion touching the installation base member 3.

After insertion of the equipment body 10, by rotating the screw shaft 14 in the clockwise direction by the use of the hexagonal lever 22, the moving member 16 advances downward in the drawing together with the fastening member 17. Accordingly, the guide plate 12c moves relatively backward and the pushing force of the pushing portion 12e against the fastening member 17 is removed. Then, the arms 19a of the spring 19 push the fastening member 17, so that the fastening member 17 is caused to pivot in the clockwise direction about the pin 16c. As a result, as shown in FIG. 5, the tip 17d of the fastening member 17 projects outward beyond the side plate 12 and this tip 17d opposes to the inner face of the installation base member 3. Thereafter, as the screw shaft 14 is rotated further, the fastening member 17 advances by the movement of the moving member 16, and the installation base member 3 is pinched by the tip 17d of the fastening member 17 and the pinching portion 12d of the side plate 12, whereby the equipment body 10 is settled.

Though the foregoing attaching work was performed, as shown in FIG. 7, under the state where the fastening member 17 has been pivoted in the counterclockwise direction, it is also achieved in a different manner. That is, as shown in FIG. 5, the equipment body 10 may be inserted into the mounting hole 3a under the state where the tip 17d of the fastening member 17 is projecting beyond the side plate 12. In this case, at the time of insertion, the side plate 17c of the fastening member 17 abuts upon the margin of the installation base member 3 and, by the force of insertion, the fastening member 17 pivots once in the counterclockwise direction in opposition to the spring force of the spring 19. Then, at the position when the equipment body 10 has been inserted inside the installation base member 3, the spring 19 causes the fastening member 17 to open outward as shown in FIG. 5. After that, the screw shaft 14 is rotated in the clockwise direction by the use of the hexagonal lever 22, whereby the installation base member 3 is pinched by the tip 17d of the fastening member 17.

When to detach the equipment body 10, the screw shaft 14 is rotated in the counterclockwise direction by the hexagonal lever 22. By this rotation, the moving member 16 moves backward together with the fastening member 17 to remove the pinching force from the installation base member 3. As the screw shaft 14 is rotated further, as shown in FIG. 7, the fastening member 17 abuts upon the pushing portion 12e thereby to be pivoted, thus, the tip 17d of the fastening member 17 goes inside the side plate 12. At this position, the equipment body 10 can be pulled out through the mounting hole 3a.

While, in the illustrated first embodiment, the spring 19 is attached around the screw shaft 14, this spring may be attached to the pins 16c or other structural members.

Figure 10:
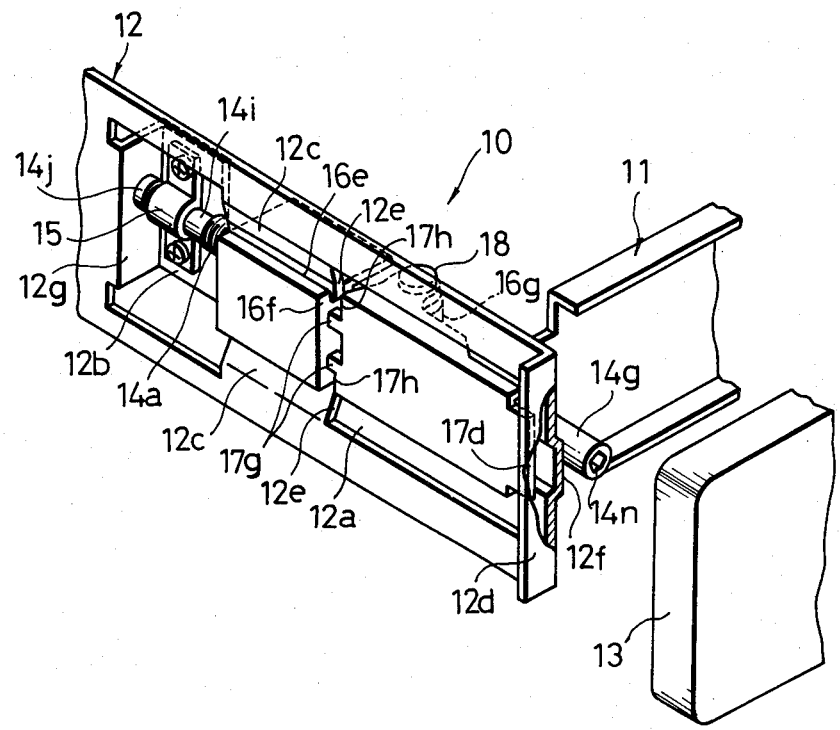
FIG. 10 is a perspective view of a second embodiment of the present invention.
Figure 11:
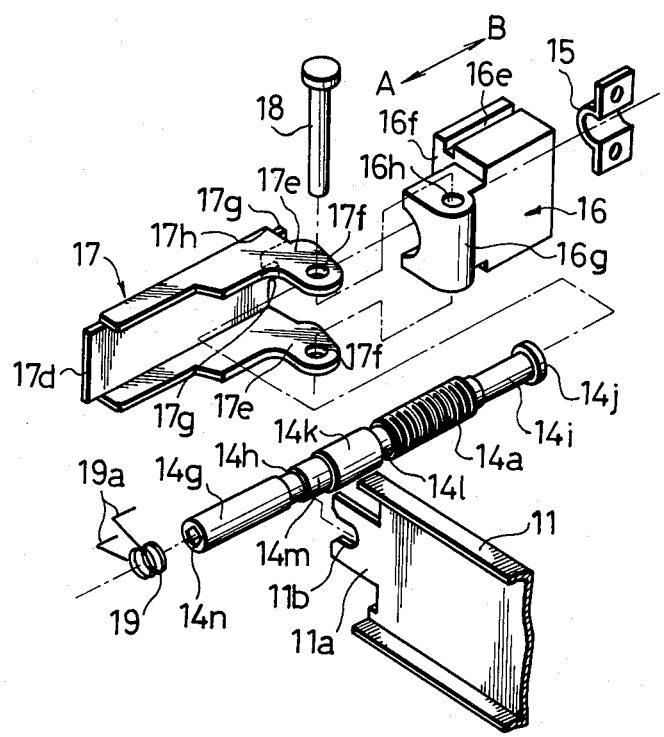
FIG. 11 is an exploded perspective view similar to FIG. 10, but observed from the opposite direction.

Now, the second embodiment of the present mounting device will be described with reference to FIGS. 10 through 12(C), in which FIG. 10 is the perspective view, FIG. 11 is the exploded perspective view observed from the opposite direction to FIG. 10, and FIGS. 12(A) through 12(C) are the explanatory views showing the attaching and detaching operations.

FIG. 10 illustrates in the perspective view a portion of the body of an equipment for use on vehicles, such as car radio or car stereo-set. The casing of the body 10 is composed of the front chassis 11, side plates 12, the nose section 13 to cover the front of the front chassis 11, and the like. The nose section 13 is formed by resin material. For explanation, the body 10 of the equipment for use on vehicles is to be mounted on the installation base member indicated by "3" in FIG. 1 (for example, the dashboard of a car). As shown in FIGS. 12(A) through 12(C), the installation base member 3 is bored with the mounting hole 3a through which the body 10 is inserted.

The front chassis 11, side plates 12 and nose section 13 composing the body 10 are assembled and settled together by means of screws or other means. Here, the configuration of the body 10 is bilaterally symmetrical, so that the same mechanism as that shown in FIG. 10 is also provided on the right side plate of the body 10.

The side plate 12 is formed with the notch 12a. In rear of this notch 12a there is provided the support rest 12b formed by bending a plate inward into the form of a crank, and at the center portion of the notch 12a there are provided the guide plates 12c bent into a substantially L-shaped form and extending inward from the upper and lower margins of the notch. The front edge of each guide plate 12c forms the pushing portion 12e for pivoting the fastening member 17 which will be described hereinafter. Further, the front end of the side plate 12 is bent outward to form the pinching portion 12d. In addition, on the inside face at the front end of the side plate 12 there is provided a guide projection 12f formed by bending a plate to produce a raised portion. As shown in FIG. 12(A), this guide projection 12b abuts upon a front portion of the screw shaft 14 to hold the same.

At each side end portion of the front chassis 11 there is provided the support piece 11a, and this support piece 11a is formed with the notch 11b (see FIG. 11). Thus, the screw shaft 14 is supported rotatably by the support rest 12b and the support piece 11a. That is, in the front section of the screw shaft 14 there is formed a support groove 14h which is supported by the notch 11b of the support piece 11a. Further, in the rear section of the screw shaft 14 there is formed a small-diameter portion 14i, and this small-diameter portion 14i is held rotatably by the support rest 12b by the aid of the retaining metal fitting 15. At the rear end of the screw shaft 14 there is formed a flange 14j which is positioned between the retaining metal fitting 15 and the side plate 12g of the support rest 12b to restrict the movement in the axial direction of the screw shaft 14 (see FIG. 10).

The screw shaft 14 is formed around its center portion with the screw 14a, this screw 14a being fitted into the screw hole formed in the moving member 16. In front of the screw 14a of the screw shaft 14 there is formed a large-diameter portion 14k whose end portion serves as a stopper 14l. Thus, as the screw shaft 14 is rotated the moving member 16 moves in the A or B direction, but, when moving in the A direction a stepped face 16f of the moving member 16 abuts upon the stopper 14*l*, whereby a further movement thereof in the A direction is restricted.

In the upper and lower faces of the moving member 16 are formed the guide grooves 16*e*, these guide grooves 16*e* are engaged with the guide plates 12*c* of the side plate 12 so that the moving member 16 is slidable frontward and rearward (in the A, B directions) along the side plate 12. In front of the stepped face 16*f* of the moving member 16 there is formed integrally a support element 16*g* which is bored with a support hole 16*h* passing vertically. To this support element 16*g* the fastening member 17 is coupled. This fastening member 17 is formed by bending a plate into the shape of a "U". At rear portions of the U-shaped bent portions there are formed support pieces 17*e* extending laterally, a pin 18 is inserted into holes 17*f* bored in these support pieces 17*e*, this pin 18 is also inserted into the support hole 16*h* of the moving member 16, thus, the fastening member 17 is supported pivotably by the moving member 16. Further, at the rear end of the fastening member 17 there are provided a pair of projections 17*g* which oppose to the stepped face 16*f* of the moving member 16. Furthermore, upper and lower margins 17*h* in the rear of the fastening member 17 oppose to the pushing portions 12*e* which are the edges of the guide plates 12*c* of the side plate 12 (see FIG. 10). In addition, the tip 17*d* of the fastening member 17 opposes to the pinching portion 12*d* which is the front end of the side plate 12.

At the portion adjacent the support groove 14*h* on the screw shaft 14 there is formed a spring attaching portion 14*m* around which the spring 19 is mounted. The spring 19 has a pair of arms 19*a* extending therefrom which are abutting upon the inner face of the fastening member 17. By the pressure of this spring 19 the fastening member 17 is urged so that its tip 17*d* projects outward the side plate 12.

The screw shaft 14 is rotated by a tool 21 (see FIG. 12(A)). In the illustrated second embodiment, a pentagonal rod is used as the tool 21. To couple this pentagonal rod with the screw shaft 14, in its front face there is formed a pentagonal hole 14*n*. The reason of using the pentagonal rod as the tool 21 is to prevent robbing of the equipment mounted on a vehicle. That is, if the drive hole of the screw shaft 14 is shaped in the hexagonal form as usual, the equipment body 10 can be easily detached and robbed from the vehicle. But, by means of the pentagonal hole, its generality is lost and robbing of the equipment might be avoided.

Now, the attaching and detaching work of the equipment body 10 relative to the installation base member 3 will be described with reference to FIGS. 12(A) through 12(C).

When to insert the equipment body 10 inside the installation base member 3, the tool 21 is engaged in the pentagonal hole 14*n* formed in the front face of the screw shaft 14 and the screw shaft 14 is previously rotated in the counterclockwise direction. By this operation, the moving member 16 screw-coupled with the screw shaft 14 moves back together with the fastening member 17 in the arrow B direction as indicated in FIG. 12(A). In the course of this movement, because the guide plate 12*c* of the side plate 12 is stationary, the pushing portion 12*e* at its edge pushes the upper and lower margins 17*h* at the rear end of the fastening member 17. As a result, the fastening member 17 pivots about the pin 18 in the counterclockwise direction in viewing the drawing, finally, it goes inward beyond the surfaces (indicated by the chained line in FIG. 12(A)) of the side plate 12. At this position, the arms 19*a* of the spring 19 come to the flexed state. Under the state shown in FIG. 12(A), if the equipment body 10 is inserted through the mounting hole 3*a*, there occurs no striking between the fastening member 17 and the installation base member 3.

After insertion of the equipment body 10 inside the installation base member 3, as the screw shaft 14 is rotated in the clockwise direction by the use of the tool 21, the moving member 16 together with the fastening member 17 advances in the arrow A direction. In response thereto, the fastening member 17 departs from the guide plate 12*c* of the side plate 12 and the pushing portion 12*e* discontinues its action of pushing the fastening member 17. Then, the arms 19*a* of the spring 19 push the fastening member 17 by its spring force to cause the fastening member 17 to pivot about the pin 18 in the clockwise direction. The fastening member 17 stops pivoting at the position where the projections 17*g* at its rear end abut upon the stepped face of the moving member 16. At this position, the tip 17*d* of the fastening member 17 projects outward beyond the side plate 12 and opposes to the inner face of the installation base member 3. As the screw shaft 14 is rotated further in the clockwise direction, the fastening member 17 together with the moving member 16 advances, accordingly, the installation base member 3 is pinched by the tip 17*d* of the fastening member 17 and the pinching portion 12*d* of the side plate 12, thus, the equipment body 10 is settled.

For reference, as shown in FIG. 12(C), if the screw shaft 14 is continuously rotated in the clockwise direction, supposedly, in the absence of the installation base member 3, at first, the fastening member 17 projects outward beyond the side plate 12 as described hereinabove. As it is rotated further, the stepped face 16*f* abuts upon the stopper 14 formed at the end of the large-diameter portion 14*k* on the screw shaft 14, and a further advancement of the moving member 16 is prevented. That is, the present device is designed so that at this prevented position a gap "x" is formed and left between the tip 17*d* of the fastening member 17 and the pinching portion 12*d*. If the size of this gap x is selected smaller than the thickness of the installation base member 3 (for example, x is 1.5 mm or so, provided that the thickness of the installation base member 3 is 2 to 3 mm), even though the screw shaft 14 is rotated in the clockwise direction to the utmost limit in setting the body 10, the cutting by the tip 17*d* of the fastening member 17 into the installation base member 3 can be suppressed to a moderate degree. Therefore, even if the installation base member 3 is made by soft material such as aluminium, the periphery of the mounting hole 3*a* can not be destroyed.

Though the foregoing attaching work was performed, as shown in FIG. 12(A), under the state where the fastening member 17 has been pivoted inside the side plate 12, it is also achieved in a different manner. That is, as shown in FIG. 12(B), the equipment body 10 may be inserted into the mounting hole 3*a* under the state where the tip 17*d* of the fastening member 17 is projecting beyond the side plate 12. In this case, at the time of insertion, the side face of the fastening member 17 abuts upon the margin of the mounting hole 3*a* and, by the force of insertion, the fastening member 17 pivots once in the counterclockwise direction in opposition to the spring force of the spring 19. Then, at the position when the equipment body 10 has been inserted inside the installation base member 3, the spring 19 functions as to push the fastening member 17 outside the side plate 12. After that, the screw shaft 14 is rotated in the clockwise direction by the use of the tool 21, whereby the installation base member 3 is pinched by the tip 17d of the fastening member 17.

When to detach the equipment body 10, the screw shaft 14 is rotated in the counterclockwise direction. By this rotation, the moving member 16 moves back together with the fastening member 17 in the B direction to remove the pinching force from the installation base member 3. As the screw shaft 14 is rotated further, as shown in FIG. 12(A), the fastening member 17 abuts upon the pushing portion 12e thereby to be pivoted, thus, the tip 17d of the fastening member 17 is stored inside the side plate 12. At this position, the equipment body 10 can be pulled out through the mounting hole 3a.

While, in the illustrated second embodiment, the spring 19 is attached around the screw shaft 14 too, this spring may be attached to the pin 18 or other structural members.

As will be apparent from the foregoing description, the present invention produces the following effects:

(1) The present mounting device is structured so that the moving member and fastening member are moved through rotation of the screw shaft and the installation base member is pinched by the fastening member and the pinching portion, the equipment body is reliably fixed to the installation base member and the installed state of the body is stable.

(2) Because the fastening member is pivoted on the moving member and urged outward by the spring, and can be returned toward the side plate by shifting the moving member, the fastening member can be actuated only through rotation of the screw shaft by the use of the tool, and setting and detaching of the equipment body with respect to the installation base member can be performed surely, thus, the attaching/detaching work relative to the installation base member is simplified.

Figure 1:
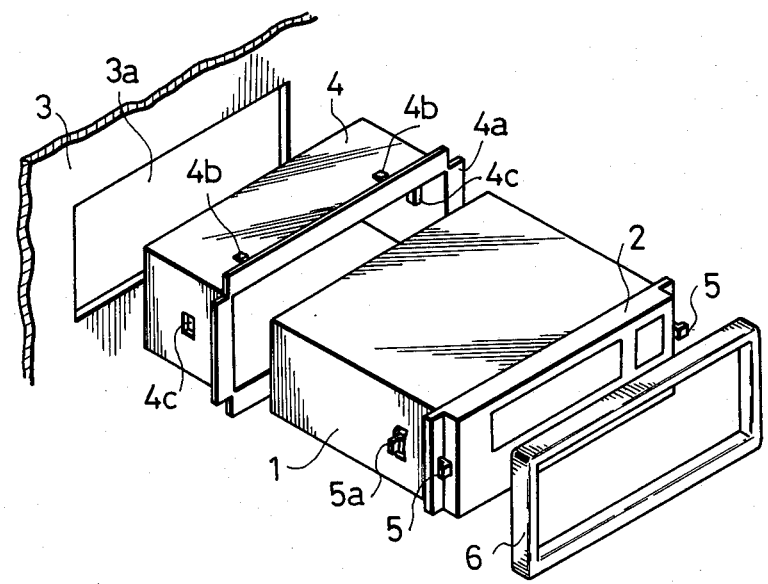
FIG. 1 is an exploded perspective view of the conventional mounting device of equipments for use on vehicles.
Figure 2:
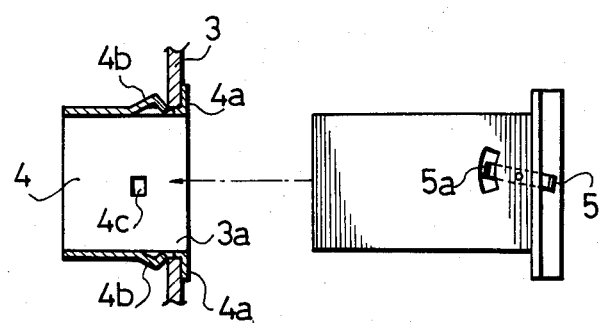
FIG. 2 is a side view of the device shown in FIG. 1.

(3) Because the installation base member is pinched by the fastening member and the pinching portion of the body, the inner case shown in FIG. 1 becomes unnecessary. The gasket employed in the prior art becomes also unnecessary, thus, the number of parts decreases. Because of no use of such a gasket the external appearance in the mounted state becomes fine.

(4) Because the stopper is provided which stops the moving member when a certain distance is obtained between the fastening member and the pinching portion while the moving member moves in the pinching direction relative to the installation base member, the pinching pressure imposed on the installation base member by the fastening member and the pinching portion can be set so as not to become excessive. Thus, destruction of the installation base member is prevented, and even if the installation base member were made by soft material such as aluminium, the attaching work can be performed without paying more attention than necessary.

(5) If the shape of the hole bored in the front face of the screw shaft is selected to be an unusual form such as a pentagon, the conventional tool can not rotate the screw shaft, thus, the equipment mounted on the vehicle can be protected from robbing.

While the preferred embodiments have been described, variations thereto will occur to those skilled in the art within the scope of the present inventive concepts which are delineated by the following claims.

What is claimed is:

1. A mounting device of equipments for use on vehicles of the type in that
    a screw shaft is provided inside a side plate of an equipment body extending in the body-insertion direction relative to an installation base member,
    a fastening member is pivoted on a moving member screw-coupled with said screw shaft which fastening member is urged by a spring in the direction of projecting beyond said side plate,
    a pinching portion is provided in said equipment body for pinching said installation base member together with said fastening member being projecting, and
    a pushing portion is also provided in said equipment body which abuts upon said fastening member to pivot said fastening member inside said side plate when said moving member is moved by means of said screw shaft in the direction of departing from said pinching portion.

2. A mounting device of equipments for use on vehicles as set forth in claim 1, wherein said screw shaft is bored in its front face with a hole into which a tool is fittable for rotating said screw shaft.

3. A mounting device of equipments for use on vehicles as set forth in claim 1, wherein said moving member is guided by portions of said side plate.

4. A mounting device of equipments for use on vehicles as set forth in claim 1, wherein said spring is mounted around said screw shaft.

5. A mounting device of equipments for use on vehicles of the type in that
    a screw shaft extending in the body-insertion direction into an installation base member and a moving member screw-coupled with said screw shaft are provided on a side plate of an equipment body,
    a fastening member is supported on said moving member which is urged by a spring as to pivot in the direction of projecting beyond said side plate,
    said equipment body is further equipped with a pinching portion for pinching said installation base member together with said fastening member being projected by the action of said spring when said moving member is moved by the operation of said screw shaft,
    a stopper for stopping said moving member when a certain distance is obtained between said fastening member and said pinching portion while said moving member moves in the pinching direction relative to said installation base member, and
    a pushing portion which abuts upon said fastening member moving back together with said moving member to pivot said fastening member inside said side plate when said moving member is moved back in the direction of departing from said pinching portion.

6. A mounting device of equipments for use on vehicles as set forth in claim 5, wherein said screw shaft is bored in its front face with a pentagonal hole into which a tool is fittable for rotating said screw shaft.

7. A mounting device of equipments for use on vehicles as set forth in claim 5, wherein said stopper is formed on said screw shaft.

8. A mounting device of equipments for use on vehicles as set forth in claim 5, wherein said pushing portion is a part of said side plate.

* * * * *